United States Patent [19]

Patel et al.

[11] Patent Number: 4,567,117
[45] Date of Patent: Jan. 28, 1986

[54] FUEL CELL EMPLOYING NON-UNIFORM CATALYST

[75] Inventors: Pinakin Patel, Danbury, Conn.; Dilip Dharia, Edison, N.J.; Hansraj Maru, Brookfield Center, Conn.

[73] Assignee: Energy Research Corporation, Danbury, Conn.

[21] Appl. No.: 642,375

[22] Filed: Aug. 20, 1984

Related U.S. Application Data

[63] Continuation-in-part of Ser. No. 396,399, Jul. 8, 1982, Pat. No. 4,467,050.

[51] Int. Cl.⁴ .............................................. H01M 8/18
[52] U.S. Cl. ...................................... 429/19; 429/26; 429/34
[58] Field of Search ...................... 429/19, 26, 24, 34, 429/39

[56] References Cited

U.S. PATENT DOCUMENTS

| | | | |
|---|---|---|---|
| 3,488,226 | 1/1970 | Baker et al. | 136/86 |
| 4,182,795 | 1/1980 | Baker et al. | 429/13 |
| 4,365,007 | 12/1982 | Maru et al. | 429/19 |
| 4,454,207 | 6/1984 | Fraioli | 429/19 X |

Primary Examiner—Charles F. LeFevour
Attorney, Agent, or Firm—John J. Torrente

[57] ABSTRACT

A fuel cell comprising a catalyst for endothermic reforming of the hydrocarbon content of fuel in such a manner as to promote uniform temperature distribution in the cell.

20 Claims, 6 Drawing Figures

FUEL CELL EMPLOYING NON-UNIFORM CATALYST

CROSS REFERENCE TO RELATED APPLICATIONS

This application is a continuation-in-part of U.S. application Ser. No. 396,399, filed July 8, 1982 now U.S. Pat. No. 4,467,050, entitled Fuel Cell Catalyst Member and Method of Making Same.

BACKGROUND OF THE INVENTION

This invention relates to fuel cell construction and, in particular, to a method of preparing a catalyst plate for use in, in situ, reforming of process fuels such as hydrocarbons and alcohols. This invention also relates to fuel cells in which in situ or internal reforming is carried out utilizing reforming catalysts.

It has been recognized that in fuel cell operation, particularly, high temperature fuel cell operation such as found in molten carbonate and solid oxide cells, the heat generated can be used to reform the hydrocarbon content of the fuel cell process gas. The hydrocarbon content of fuel cell process gas frequently contains methane and other hydrocarbons such as, for example, propane, methanol, ethanol and other reformable organic fuels, and as used herein is also intended to include alcohols. The heat value on a mole basis, and, hence, electrical energy producing potential of methane is about three to four times greater than that of hydrogen. Since methane itself is relatively electrochemically inactive, it is very desirable to reform methane to form hydrogen and carbon monoxide in accordance with the reaction: $CH_4 + H_2O \rightarrow 3H_2 + CO$. The hydrogen and carbon monoxide can then participate in the fuel cell reaction either directly or by a further water-gas shift. An incentive for carrying out such reforming reaction in a fuel cell is that the reaction is endothermic and would serve to offset heat generated in fuel cell operation due to inherent irreversibility.

U.S. Pat. No. 3,488,226 discloses a fuel cell construction wherein reforming of process gas hydrocarbons is carried out in situ by placement of a suitable catalyst in direct heat exchange relationship to the cell. This patent teaches that placement of the catalyst uniformly along the length of the cell results in a reduction in the maximum temperature of the cell. It also mentions that by locating catalyst in the vicinity of the centroid of the cell a further reduction in the maximum temperature can be achieved.

In the '226 patent, the catalyst is in the form of nickel alumina-aluminum pellets of approximately one-half inch in diameter. These pellets are produced by crushing a nickel aluminum alloy and treating the resulting particles with a sodium hydroxide solution. The resultant mixture is maintained at its boiling point and allowed to undergo conversion of the aluminum to sodium aluminate and alumina. After the desired conversion, the reaction is quenched with water. Subsequent washings with water are followed by washings with methanol and the resultant pellets, thereafter, are stored in methanol.

U.S. Pat. No. 4,182,795, assigned to the same assigned hereof, discloses an improved construction wherein in situ hydrocarbon reforming is via a catalyst placed in an electrolyte-isolated passage, this passage being in heat transfer relationship with the cell. Such placement of the catalyst prevents electrolyte condensation which would normally occur in an electrolyte-communicative passage at cold spots created by the endothermic reforming reaction. The process gas in the electrolyte-isolated passage also acts as a cooling means so that cooling of the cell and reforming are simultaneously brought about by the single passage.

Disposition of the catalyst in the '795 patent construction is in layered or packed form uniformly along and on a plate defining the electrolyte-isolated passage. The configuration of the catalyst coated plate is U-shaped or corrugated with the catalyst being placed on the upper plate walls.

Finally, the '795 patent also mentions that a suitable catalyst for reforming methane hydrocarbon content is nickel or nickel based and that a commercially available version of such catalyst is Girdler G-56 which is provided in pellet form for packing in fixed bed type reactors.

Other practices, not specifically directed to in situ reforming in a fuel cell, but directed to forming catalyst members for hydrocarbon reforming in other applications are also known. U.S. Pat. No. 4,019,969 teaches a method for manufacturing catalytic tubes in which a metallic sponge is formed on the inner wall of a metallic tube by electrolysis. The sponge is then impregnated with appropriate salts of catalytic and ceramic substances and the assembly then roasted to provide the desired catalytic member.

U.S. Pat. No. 3,186,957 teaches a technique for forming pellet catalysts in which a slurry of alpha alumina hydrate and a soluble nickel salt are coprecipitated and, thereafter, the product calcinated at a low temperature to produce nickel oxide supported on a ceramic oxide (alumina). The coprecipitate is then formed into suitable pellet shapes and heated at a high temperature to establish a nickel aluminate interface between the nickel oxide and the ceramic oxide.

In U.S. Pat. No. 3,498,927 the starting material is a refractory oxide material which is gelled and to which is added, before or after gelling, a catalytic metal. The gel of the catalytic metal supported on the refractory material is then applied to a ceramic support structure, either by spraying or immersing. The product is then dried and calcinated to form the resultant catalyst.

U.S. Pat. No. 3,645,915 discloses a technique in which a catalyst comprised of nickel oxide, nickel chromite and a stabilizer are placed in a slurry form and the slurry applied to a refractory oxide or metallic support by impregnation or cementing. The resultant product is then calcined. When the support is metallic, the support may be roughened to provide an anchor for the applied materials.

U.S. Pat. No. 3,513,109 discloses use of a slurry of catalytic material and metal ammines and application of same to a refractory support. The slurry also may be provided with a refractory interspersant prior to applying the slurry to support. Such application may be by spraying or dipping and is followed by drying and subsequent calcination.

U.S. Pat. No. 3,627,790 teaches formation of a Raney nickel ($Ni-Al_3$) type catalyst by partially leaching aluminum from a nickel-aluminum alloy. This type catalyst is to be used for hydrogenation at the fuel cell anode and not for reforming. A further U.S. Pat. No. 4,024,075, discloses a cobalt based catalyst for low temperature operation without significant carbon deposition.

While the above patents and practices for making catalysts have proved useful in the formation of certain forms of catalyst members, i.e., pellets, honeycombs, tubular structures, further practices are still being investigated as regards formation of such members to meet the stringent requirements of in situ fuel cell reforming. In such reforming the following conditions must be satisfied: (a) the catalyst must adhere to a metallic plate having an extended continuous surface; (b) the catalyst must be able to provide satisfactory reforming rates in the range of 1000° F. to 1300° F. and 1-10 atm operating pressure; (c) the catalyst must be stable in the presence of fuel cell electrolyte and at cell operating temperatures; (d) the catalyst should permit operation at low steam-to-carbon (s/c) ratios; (e) the catalyst should provide long term operation before regeneration is required, since regeneration may affect cell anode stability; (f) the catalyst should provide low ohmic resistance; (g) the catalyst should have crushing strength sufficient to withstand cell sealing pressures; and (h) the catalyst should enable reasonable heat exchange.

It is also noted that these patents teach that distribution of the catalyst uniformly along the length of the cell results in a reduction of the temperature gradient in the cell and that by placing the catalyst at the centroid of the cell a further reduction in maximum temperature can be achieved. Such placement of catalyst taught by these patents however is not believed to provide maximum performance for the cell and may, in fact, adversely affect cell performance. For example, excessive cooling due to fresh fuel reforming at the inlet might cause freezing of the cell electrolyte in a molten carbonate fuel cell, while in a solid oxide cell, the conductivity of the electrolyte might be greatly reduced. Furthermore, the disclosed placements are not believed to promote uniform current density and/or uniform temperature distribution in the cell.

It is an object of the present invention to provide an improved fuel cell catalyst member and practice for in situ reforming of process fuels.

It is a further object of the present invention to provide a practice for realizing a fuel cell catalyst member meeting the above-mentioned requirements.

It is a further object of the present invention to provide a catalyst member of the aforesaid type which is adaptable for use in molten carbonate and solid oxide fuel cells.

It is a further object of the present invention to provide a fuel cell having a catalyst therein for, in situ, or internal reforming and which catalyst is adapted to provide improved fuel cell performance.

It is still a further object of the present invention to provide a fuel cell of the above-mentioned type wherein the catalyst is adapted to promote uniform temperature distribution and/or uniform current density in the cell.

SUMMARY OF THE INVENTION

In accordance with the principles of the present invention, the above and other objectives are realized in a practice in which a metallic fuel cell plate having an extended continuous surface is provided on such continuous surface with an electrophoretically deposited porous support layer of ceramic or refractory material and an active catalyst material capable of endothermic reforming is impregnated into the support layer.

In accordance with the embodiment of the invention to be described hereinafter, the metallic plate is first surface treated to provide a desired flatness and surface area promotive of adherence of the ceramic support material. Support material is then directly deposited on the plate by electrophoretic deposition. Following such deposition, the catalyst material is impregnated into the fine pores of the support material, preferably, by dipping the plate into a solution of the catalyst material. The impregnated plate is then dried and the dried plate activated by subjecting the plate to hydrogen or other reducing gas such as cracked ammonia under controlled heating. If desired, the activated plate may then be further processed by a final surface treatment which removes any insulating layer on the plate contact area.

In further accord with the principles of the present invention, the above and other objectives are further realized in a fuel cell including a catalyst adapted to cause endothermic reformation of the hydrocarbon content of fuel supplied to the cell in such a manner as to promote a uniform temperature distribution and/or a uniform current density within the cell. In a first embodiment in accordance with this aspect of the invention, a reforming catlyst of non-uniform activity is disposed uniformly (i.e., in uniform amount) within the fuel cell, while in a second embodiment a catalyst of uniform activity is non-uniformly disposed (i.e., disposed in non-uniform amounts) in the fuel cell. In the former case the non-uniformity in the catalyst activity is such that the catalyst exhibits lower activity at the input fuel end of the cell as compared to the output end. In the latter case, the non-uniformity in catalyst amount or concentration is such that a smaller amount of catalyst is disposed at the input fuel end as compared to the output end.

With a fuel cell configuration in accordance with the above, the fuel cell experiences a more uniform temperature distribution or profile over its length. Furthermore, the cell now tends to exhibit a substantially more uniform current density distribution. These effects together promote enhanced fuel cell performance and life.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
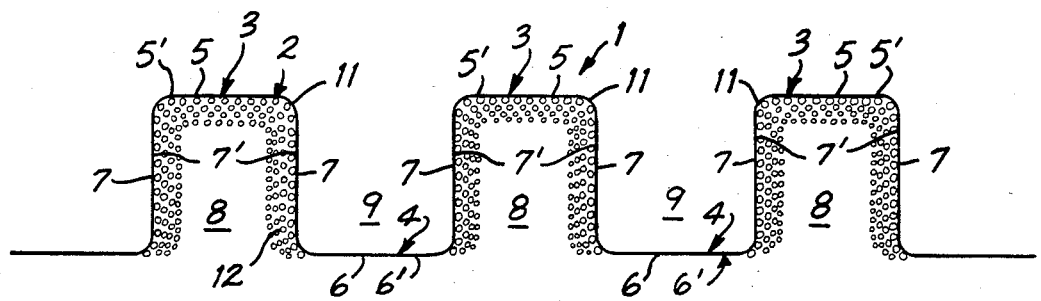
FIG. 1 illustrates a catalyst member in accordance with the principles of the present invention.

In FIG. 1, a fuel cell catalyst member 1 comprises a corrugated metallic plate or sheet 2 which, typically, might be stainless steel. The plate 2 includes crests regions 3 and valley regions 4 defined by extended continuous top plate sections 5, bottom plate sections 6 and side plate sections 7. The crests regions 3 define flow passages 8 for a first fuel process gas having a high hydrocarbon content such as, for example, methane, which is to be reformed to hydrogen as the process gas moves through these passages. The valley regions 4, in turn, define further flow passages 9 for a second fuel process gas including already reformed process gas and, therefore, of a higher hydrogen content than the first gas. This second gas is the fuel gas for the cell anode and undergoes electrochemical reaction in passage through the cell. The catalyst member is of the type used to provide the unipolar and bipolar plates (120, 124 and 130) of FIGS. 7-9 of the aforementioned U.S. Pat. No. 4,182,795.

In accordance with the invention, the catalyst member 1 is further provided on preselected surfaces of the regions 5, 6 and 7 with a porous catalyst support layer 11 of ceramic or refractory material. In particular, such support material is disposed on the surfaces of these regions defining the crest regions 3, i.e., on the lower surfaces 5' and the side surfaces 7' of the regions 5 and 7, respectively, and is directly applied by electrophoresis, as will be explained in greater detail hereinbelow. Preferable support materials are refractory or ceramic oxides such as oxides, aluminates, titanates and zirconates of suitable metals having a surface area in the range of 1 to 30 $m^2/g$. A more preferable material is lithium aluminate.

In further accord with the invention, the catalyst member 1 further comprises an active catalyst material 12 which is impregnated into the support layer 11 such that the active material is supported on the layer 11 ceramic particles. A preferable catalyst material is nickel, while other catalyst materials such as, for example, Ni-Co alloy or cobalt, might also be employed. Surface area of the catalyst material is preferably in the range of 0.1 to 10 $m^2/g$.

With the catalyst member 1 formed with the electrophoretically deposited support layer 11 and with the active catalyst 12 impregnated into the pores of such layer, a significant enhancement in active material retention and a corresponding benefit in reforming activity is realized. The overall structure thus provides effective reformation, while remaining stable in the fuel cell environment.

As can be appreciated, the catalyst member 1 can take on various configurations other than the configuration specifically illustrated. Common to these configurations will be the construction of plate and catalyst impregnated electrophoretically deposited support layer in catalyst member regions communicating with the gas to be reformed. Whether all such regions or just a number of such regions will be provided with a catalyst layer will depend upon the particular application and the degree of reforming reaction required. It is contemplated under the invention that such layer might also be applied to the surfaces of the regions 6 and 7 defining the valley regions 9, if the gas passing through such valley regions also has hydrocarbon content to be reformed. It is further contemplated that regions of the catalyst member serving to make electrical contact with other regions of the fuel cell, such as, for example, the bottom surfaces 6' of the regions 6, be free of the catalyst layer to promote good electrical contact.

Figure 2:
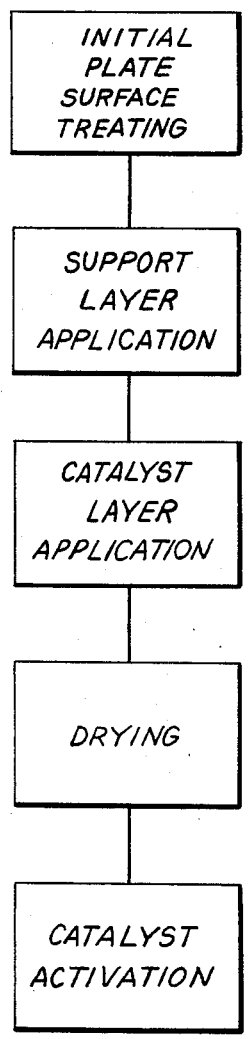
FIG. 2 shows a flow diagram of a method for fabricating the catalyst member of FIG. 1.

FIG. 2 shows a flow diagram of a method for fabricating the catalyst member 1 in accordance with the principles of the present invention. Such fabrication, as a first step, contemplates initial processing or surface treating of the metallic plate 2 to ensure flatness and surface area sufficient to obtain adherence of the catalyst support layer 11. Flatness and surface area in the respective ranges of ±3 mils and 2 to 10 $cm^2/cm^2$ are usable with more desirable ranges being ±0.5 mils and 3 to 5 $cm^2/cm^2$.

In preferred practice, the aforesaid initial processing includes an annealing step in which the metallic member is heated at a temperature in the range of from about 1800°-2100° F. in a hydrogen atmosphere for a period of about 2 to 4 hours. Annealing provides stress relief under static load and yields a resultant corrugated metallic plate of extreme flatness.

Following the annealing procedure the initial processing continues with sand blasting or chemical etching of the plate surface to increase surface area. At this point, the initial processing may be terminated and the support material deposited or the initial processing may be continued with a further stress relieving practice either through further annealing, as previously described, or through flattening at pressures in the range of 0.5 to 1.0 ton/sq. in. area.

After initial processing, application of the catalyst support layer 11 follows. In accordance with the invention, support material is applied by electrophoretic deposition, a preferable support material being lithium aluminate. In the case of the latter support material, an emulsion of a suitable solvent such as, for example, isopropanol containing a dispersing agent such as a cationic surfactant is prepared with lithium aluminate being supplied in an amount of about 50 to 90 mg. of lithium aluminate per cc. of isopropanol. Electrophoretic deposition of the emulsion is performed at voltages in the range of 500-700 volts at a current density of 1-2 $mA/cm^2$ for 20-50 seconds. The resultant deposited layer under such conditions will exhibit an acceptable porosity of 60-90% porosity and a good bond strength and stability.

Subsequent to deposition of the support material, the active material is impregnated. Preferably, this process follows immediately after (i.e., within about one to two minutes of) the deposition of the support material to prevent flaking of the electrophoretically deposited layer. Active material is nickel or a nickel alloy of surface area in the range of 1-5 $m^2/g$ and a preferable material is nickel with Co as a promoter. Impregnation can be by any conventional impregnation technique so as to fill the fine pores of the support material. A typical technique might be chemical deposition of a salt of active material by horizontal dipping or soaking of the plate in a solution containing the active material. Soaking efficiency preferably can be improved by first applying a vacuum over the plate and then contacting the active material solution. Where nickel is the active material, a solution of nickel salt can be used. Typical salts might be $Ni(NO_3)_2$, $NiSO_4$, $NiCO_3$, nickel formate or acetate or combinations thereof. To this solution might also be added a volatile base such as, for example, $(NH_4)_2CO_3$ or $NH_4OH$.

The impregnated catalyst member is then subjected to drying. Preferably air drying is used and continues for a period of 2-4 hours. Drying is further preferably carried out to provide uniformity in the catalyst layer. Horizontal disposition of the structure during drying provides the desired uniformity.

After drying has been completed, the catalyst material is activated. This can be done either with the catalyst member in situ or prior to the fuel cell construction. In the latter case, the member is placed in a hydrogen atmosphere under controlled heating whose rate is dependent on the active material applied and its melting point.

At this point, fabrication of the catalyst member 1 is complete with the exception of removal of applied layered material in plate areas where the layers are not desired. In particular, it is desirable to remove the layers from plate areas where a good and uniform electrical contact with other components of the cell is desired. Such removal can typically be carried out by scraping or some other equivalent material removal technique.

Figure 3:
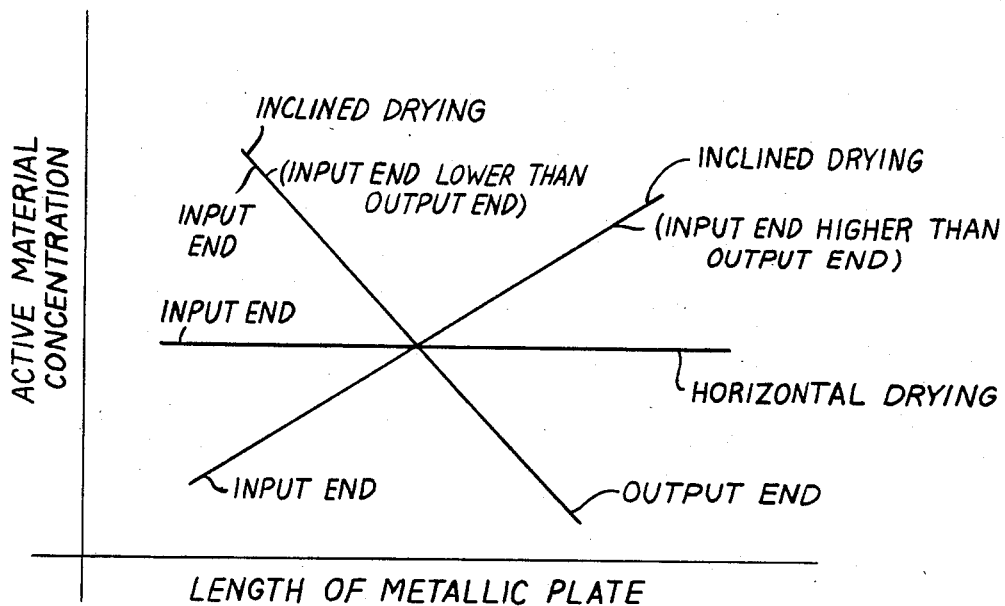
FIG. 3 illustrates catalyst concentration and/or support layer thickness along the length of the catalyst member for various angles of catalyst impregnation.

In the above-described procedure, drying of the impregnated catalyst was carried out with the plate 2 in horizontal orientation in order to obtain a uniform concentration and, therefore, uniform activity of the catalyst over the length of the plate. If other than a uniform concentration is desired then the plate can be inclined at various angles to the horizontal to obtain the desired non-uniformity. Thus, for example, if a larger concentration of the catalyst were desired at the input gas end of the plate relative to the output gas end, then the plate would be inclined during drying so as to situate the input end at a lower position than the output end (FIG. 3). If, on the other hand, a larger concentration were desired at the output end relative to the input end, the inclination of the plate would be reversed, i.e., the input end would be situated at a higher position than the output end. FIG. 3 pictorially shows catalyst concentration along the plate 2 length for the horizontal drying case and the above inclined drying cases.

With respect to impregnation of the catalyst layer, it also should be noted that promoters can be added to the catalyst layer in order to improve activity. Thus, materials such as, for example, Co, Cr, Mg, Mn, Ce and rare earth materials can be added. These materials may be in oxide form or elemental.

Using the above-described process, a number of catalyst members were constructed as illustrated by the following examples.

EXAMPLE I

In this example, a catalyst member with uniform catalyst concentration was obtained.

(A) Initial Plate Surface Treating:

A lightweight corrugated SS sheet metal plate (6.5"×6.5") was annealed at temperatures of 1850° F. in $H_2$ atmosphere for 3 hours. This stress relieving under static load yielded a very flat plate which is desirable for adherence of the support layer.

The annealed SS plate was then sand blasted to increase its surface area for enhancing the bond with the support material. The SS plate was then cold pressed (0.6 ton/sq. in. area) prior to the deposition of the support material.

(B) Support Layer Application:

Lithium aluminate support material was then electrophoretically deposited on the plate. The surface area of the lithium aluminate used was 17 $m^2/g$ as determined by the BET method. An intimate emulsion of lithium aluminate in isopropanol using 1 wt % of Doumeen TDO cationic surfactant was prepared. The emulsion had 78 mg of $LiALO_2$ per cc of isopropanol. The electrophoretic deposition of the high surface area lithium aluminate on the sheet metal was performed at 530 volts and a current of 396 mA for 30 seconds. Using the above conditions, a deposited support layer having approximately 70% porosity was obtained. The total weight of lithium aluminate was 6.4 gm.

(C) Catalyst Layer Application

Nickel active material was then impregnated into the fine pores of the lithium aluminate support layer. This was done by dipping (horizontal soaking) in a concentrated (3.4 M) solution of ($NiNO_3 \cdot 6H_2O$). Methanol also could have been used.

The dipping was carried out immediately after electrophoretic deposition to prevent flaking. With 3.4 M $NiNO_3 \cdot 6H_2O$ solution, a soaking time of 4 hours yielded approximately 24 gm. loading of the salt.

It is undesirable to use water as a solvent becausee it may attack the porous support layer. $NiSO_4$ may be used but the $H_2S$ produced during in situ activation can poison the nickel anode. However, it may be used for a specific case of internal reformer where the reforming is done in an isolated chamber.

(D) Drying

Air drying of the impregnated catalyst plate structure for 3 hours was performed before its activation. Drying in the horizontal positon yielded very uniform structure.

(E) Activation

An internal reformer was built incorporating this catalyst member. The catalyst was activated in situ in an $H_2$ atmosphere under a controlled heating rate. 700 cc/min. of hydrogen and a heating rate of 1 C/min. were used. The heating rate influences the stability of catalyst structure (the flaking or sintering due to melting). The rate will vary depending upon the salt composition and its melting point.

Figure 4:
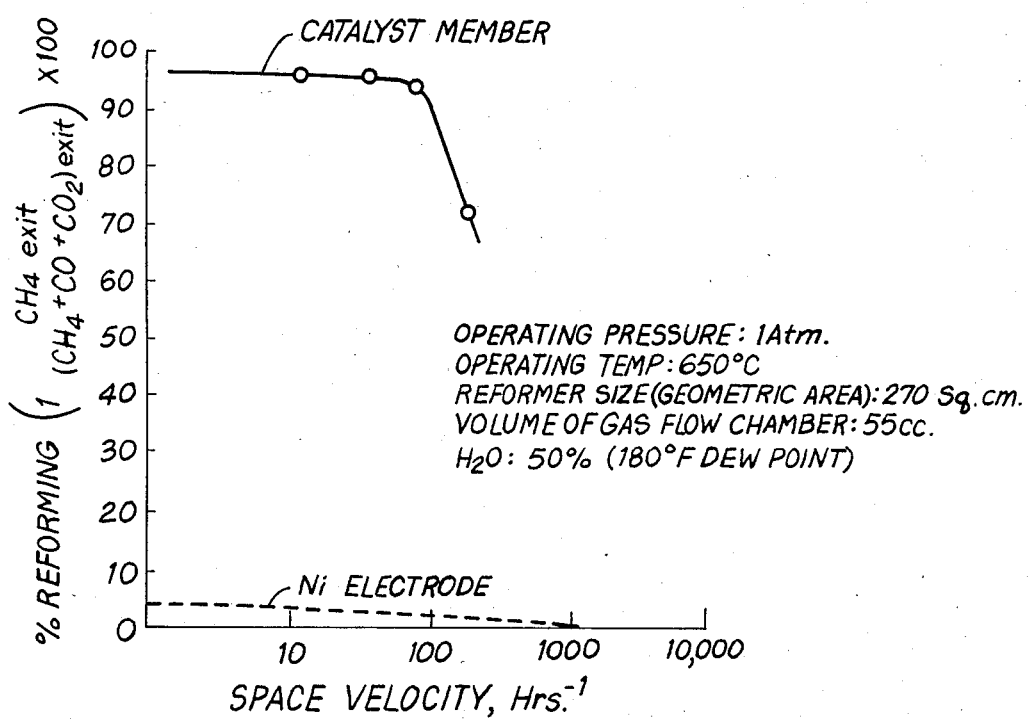
FIG. 4 shows a comparison curve for the reforming achieved with the present catalyst member as compared to a conventional member.

FIG. 4 shows the improved performance in fuel cell reforming realized with the fabricated catalyst member operated under molten carbonate fuel cell operating conditions. As can be seen from the solid line curve, 90 percent reforming of methane was realized when using the catalyst member of the invention, as compared to the less than 10 percent reforming realized when the member was not used.

EXAMPLE II

In this case, the steps of the preceding example were followed except that drying was carried out by inclining the plate so as to obtain impregnated catalyst of graded concentration and, therefore, graded activity. The angle of inclination during drying and impregnation can be used to control the gradation in the activity.

It should be noted that, utilizing the practice of the present invention, the resultant support layer with impregnated catalyst can be of relatively thin dimension. Typically, layers as thin as 10 to 100 mils are realizable.

Figure 5:
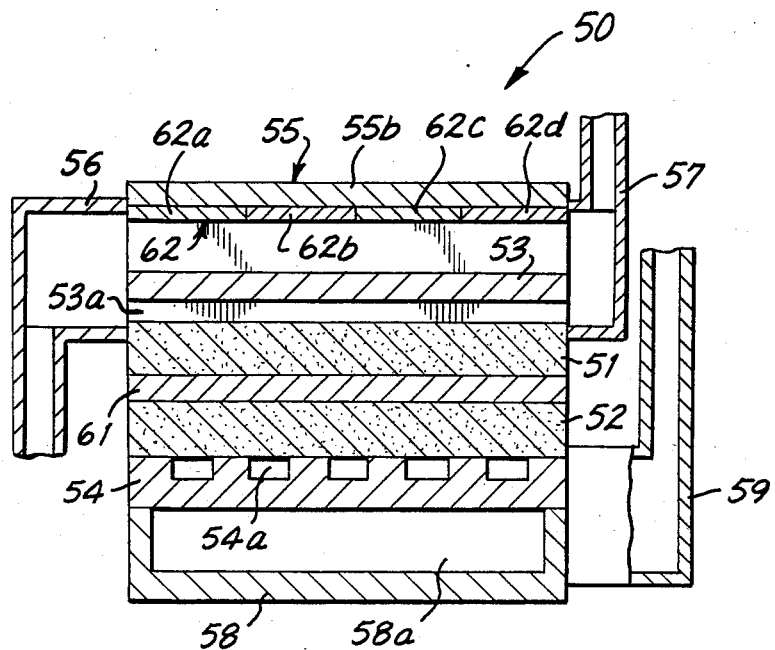
FIG. 5 illustrates a first embodiment of a fuel cell in accordance with the principles of a further aspect of the present invention.

FIG. 5 shows a fuel cell 50 in accordance with a first embodiment of a further aspect of the present invention. The fuel cell is similar to the cell disclosed in FIG. 1 of the '795 patent, but has been further adapted in accordance with such further aspect of the present invention.

More specifically, the fuel cell 50 includes anode and cathode electrodes 51 and 52 of customary gas diffusion type and an electrolyte matrix or layer 61 therebetween. Separator plates 53 and 54 are shown in the FIG. 5 single cell embodiment as being of unipolar character, defining channel passages 53a for supplying fuel process gas to anode electrode 51, and passages 54a for supplying oxidant process gas to cathode electrode 52. As can be appreciated, due to the gas-diffusion character of electrodes 51 and 52, passages 53a and 54a constitute electrolyte-communicative passages.

A catalyst member 55 comprising a thermal control plate 55b, having a reforming catalyst 62 thereon is stacked on separator plate 53. Plate 55 includes conduit passages 55a extending in like direction, i.e., across the plane of FIG. 5 with passages 53a and is commonly connected therewith by input anode gas manifold 56 and output gas manifold 57.

Thermal control plate 58 includes conduit passages 58a extending in like direction, i.e., into the plane of FIG. 1 with passages 54a and is commonly connected therewith by an input cathode gas manifold (not shown) and output gas manifold 59. Since separator plates 53 and 54 are essentially gas impermeable, thermal control plate passages 55a and 58a are essentially electrolyte isolated.

In operation of the cell of FIG. 1 fuel gas having hydrocarbon content is passed from the input conduit 56 through the catalyst containing passage 55a. The hydrocarbon content of the gas thereby undergoes an endothermic reforming reaction brought about by catalyst 62, whereby heat is absorbed from the cell via thermal control plate 55 so as to reduce the overall cell temperature. As set forth in the '795 patent, by suitable adjustment of the gas flow levels in electrolyte-communicative passages 53a and 54a, the electrical energy level of the cell is set and by suitable selection of the gas flow levels in electrolyte-isolated passages 55a and 58a and by suitable selection of the content of catalyst 62 the operating temperature range for the cell 50 is set.

In accordance with the principles of the present invention, the catalyst 62 is further selected so as to promote a uniform temperature distribution over the cell 50. This, in turn, promotes a more uniform production of hydrogen from the hydrocarbon content of the fuel gas, and a more uniform current density distribution. Thus, the efficiency of the cell is maximized, and the stability of the cell components is also enhanced..

More specifically, in FIG. 5, the catalyst 62 comprises a plurality of catalyst sections 62a, 62b, 62c and 62d which are of uniform amount or concentration, but of different activity. In particular, in accord with the invention, the activity of catalyst section 62a is less than that of catalyst section 63b, that of section 62b is less than that of section 62c and that of section 62c is less than that of section 62d. Thus, there is an increase in catalyst activity proceeding from catalyst section 62a to 62d and, thus proceeding in the direction of the flow of gas being reformed, i.e., from the input or entry to the output or exit gas end of conduit 55a.

With this type of construction for the catalyst 62, the reforming reaction taking place at the gas entry end of the conduit 55a is slowed in spite of the high concentration of hydrocarbon content at this point. This slowing of the reaction is due to the lower activity catalyst section 62a. On the other hand, at the exit end of the conduit, the reaction is increased in spite of the lower concentration of hydrocarbon, due to the higher activity catalyst secton 62d. The overall result is thus a more uniform temperature distribution over the length of the conduit 55a and thus over the cell. As above-indicated, this uniformity in reaction promotes uniform hydrogen production over the cell, which, in turn, enhances fuel cell performance.

Figure 6:
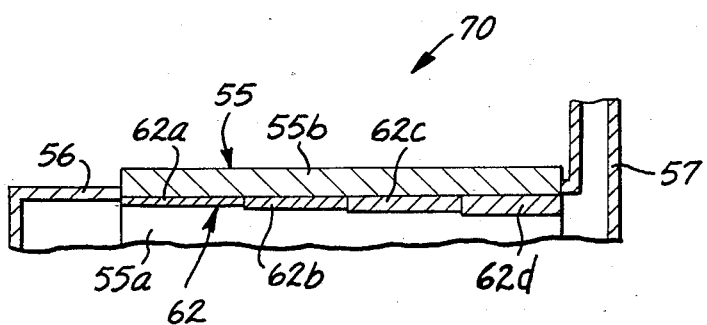
FIG. 6 shows a second embodiment of a fuel cell in accordance with the principles of the present invention.

FIG. 6 shows another embodiment of a fuel cell 70 in accordance with the invention. In this case, the cell 70 is assumed to be of like configuration to the cell 50, except for the cell catalyst layer. Thus only the portion of the cell containing the layer is shown.

In particular, in FIG. 6 the catalyst layer 62 of cell 70 comprises catalyst sections 62a through 62b which are of the same uniform activity, but of non-uniform or different amount or concentration. Thus, the section 62a is of less amount than the section 62b, the section 62b is of the less amount than the section 62c and the section 62c is of less amount than the section 62d. The catalyst 62 therefore exhibits an increased amount or concentration in proceeding from the input to the output gas end of conduit 55a and, hence, in the direction of the fuel gas being reformed therein.

With the construction of FIG. 6, the reforming reaction at the input end of conduit 55a is again slowed due to the lower amount of catalyst 62a, while the reaction at the output end of conduit is increased due to the higher amount of catalyst 62d. Hence, as in the FIG. 5 case, an overall more uniform current density is achieved.

As can be appreciated, in the catalyst 62 of FIG. 5 the amount or concentration of each catalyst section is made uniform or the same by selecting the length, width and height of each section to be the same and the activity of each of the sections is made different by selecting different catalysts for each section. In the FIG. 6 catalyst, different concentrations for the catalyst are realized by selecting the sections to be of equal length and width, but different height. The same activity for the sections, in turn, is achieved by selecting the same catalyst for each section.

It should be noted that, while four specific catalyst sections have been shown in FIG. 5 to illustrate the invention, the number of sections employed will depend upon the degree of uniformity desired. When carried to its limit, the catalyst can be made to continuously vary in activity over the length of the conduit 55a.

Likewise, in the embodiment of FIG. 6 the concentration or amount of catalyst can be made to continuously vary over the length of the conduit. Such non-uniformity in catalyst content or gradation can be realized as discussed on page 14, line 20 through page 15, line 7 above.

In situations where the plate 53 is corrugated or, if plate 53 is dispensed with and the anode 51 is corrugated, and the plate 55b is also corrugated, the corrugations of the plate 55b can be parallel to those of the plate 53 and/or anode 51, as well as transverse or orthogonal thereto. The latter two cases are advantageous since they permit modification of the behavior of the gas being reformed and, in particular, since they permit turbulence to be created in such gas by it hitting the corrugations of plate 55b.

It is also important to note that while the aspect of invention shown in FIGS. 5 and 6 has been described in terms of a catalyst situated in an electrolyte-isolated passage, the principles of the invention are equally applicable to fuel cells wherein the catalyst is within an electrolyte-communicative passage such as the passage 53a, in FIG. 5.

Furthermore, while FIGS. 5 and 6 show specific embodiments of catalyst 62 adapted to to provide reformation of the hydrocarbon content of fuel process gas in a manner which also promotes uniform temperature distribution in a fuel cell, it is noted that variations of these specific embodiments might also be used to achieve the same result. Thus, for example, different concentrations for the catalyst sections 62a–62d of the FIG. 6 catalyst layer might be achieved by packing the catalyst more heavily or more lightly in the same volume of space. Also, a combination of the FIG. 5 and FIG. 6 embodiments might be employed. In such cases, one or more sections of the layer might have both a different activity and a different concentration than that of the other sections.

It is also within the contemplation of the invention to use a catalyst member 55 wherein the catalyst chamber 55a, runs transverse or even orthogonal to the fuel process gas passage 53a and thus to the direction of flow of the fuel process gas in such chamber. In sucn case, the chamber 55a might be fed from a separate manifold and the catalyst 62 would have a non-uniformity of the type described above, i.e., would have increasing activity and/or increasing concentration in proceeding along the direction of flow of the fuel gas being reformed.

It is further important to note that in some situations, it may be advantageous to associate the catalyst 62 directly with a fuel cell electrode, particularly, anode electrode 51. Thus, the catalyst 62 might be a layer directly applied to the anode or might be formed as part of the anode or might be incorporated into the pores of the anode. In any case, the catalyst would again have a non-uniformity as described above, i.e., would increase in activity in proceeding along the direction of flow of the fuel gas undergoing reformation A particular example of the advantageous use of this type of construction might be in a molten carbonate fuel cell. In this type of cell, lithium aluminate of different surface area or different amount or concentration may be impregnated into the anode electrode and then catalyzed with a high surface area nickel catalyst. In the first case (different surface area), the resultant catalyst in the anode would have a non-uniform (increasing) activity in the direction of fuel flow and in the second case (different concentration), the catalyst would have a non-uniform (increasing) concentration in the direction of such flow.

Alternatively, instead of impregnation, a nickel catalyst of different surface area or of different concentration can be applied as a layer to the anode, thereby obtaining the desired distribution of reforming rate and, as a result, the desired tailoring of the temperature and current density distributions.

The above technique of using a catalyst applied directly to the anode can be used alone for reforming or can be used with a catalyst applied to a plate, as in FIGS. 5 and 6, the latter catalyst being graded to further promote uniform temperature distribution or being ungraded, as desired.

Finally, in designing the non-uniformity of the catalyst 62, other cooling effects in the cell (such as cooling by the cathode gas or a separate cooling medium) may have to be accounted for and may, for most advantageous results, require modification of the non-uniformities discussed above to better approximate a more uniform temperature distribution.

In all cases, it is understood that the above-described arrangements and practices are merely illustrative of the many possible specific embodiments which represent applications of the present invention. Numerous and varied other arrangements can readily be devised in accordance with the principles of the present invention without departing from the spirit and scope of the invention. Thus, for example, as an alternative to the material removal step, the application of support material and active material can be carried out selectively by screening or some other means so as to provide application only in the desired plate areas.

What is claimed is:

1. A fuel cell for receiving fuel having hydrocarbon content comprising:
an anode
a cathode
and means within said cell for reforming the hydrocarbon content of said fuel, said reforming means comprising: a passage in said cell, said passage having an input end for receiving said fuel and an output end; and a catalyst situated along the length of said passage between said input and output ends of endothermic reformation of said hydrocarbon content of said fuel, the amount and activity of said catalyst at points along said length being selected to promote uniform temperature distribution for said cell over said length.

2. A fuel cell in accordance with claim 1 wherein: said catalyst exhibits non-uniform activity at different points spaced along the length of said passage between said input and output ends.

3. A fuel cell in accordance with claim 1 wherein: the activity of said catalyst at a given point from said input end of said passage is less than the activity of said catalyst at a point further than said given point from said input end of said passage.

4. A fuel cell in accordance with claim 3 wherein: said catalyst comprises a plurality of sections arranged one following the other along said length, said catalyst sections each being of different activity, the activity of said sections increasing when proceeding from section to section in the direction of said output end of said passage.

5. A fuel cell in accordance with claim 4 wherein: said catalyst is uniform in amount over said length.

6. A fuel cell in accordance with claim 4 wherein: each of said catalyst sections is of the same uniform amount.

7. A fuel cell in accordance with claim 1 wherein: the activity of said catalyst continuously increases over said length proceeding from said input to said output end of said passage.

8. A fuel cell in accordance with claim 1 wherein: said catalyst is of non-uniform amount at different points spaced along the length of said passage.

9. A fuel cell in accordance with claim 8 wherein: the amount of said catalyst at a given point from said input end of said passage is less than the amount of said catalyst at a point further than said given point from said input end of said passage.

10. A fuel cell in accordance with claim 9 wherein: the amount of said catalyst continuously increases over said length proceeding from said input to said output end of said passage.

11. A fuel cell in accordance with claim 10 wherein: said catalyst is of uniform activity over said length.

12. A fuel cell in accordance with claim 9 wherein: said catalyst comprises a plurality of sections, one following the other along said length, said catalyst sections each being different in amount, the amount of said sections increasing when proceeding from section to section in the direction of said output end of said passage.

13. A fuel cell in accordance with claim 12 wherein: each of said catalyst sections is of the same uniform activity.

14. A fuel cell in accordance with claim 1 wherein:

said anode and cathode define a space therebetween for
   receiving an electrolyte;
and said passage is in electrolyte communication.

15. A fuel cell in accordance with claim 1 wherein:
said anode and cathode define a space therebetween for
   receiving an electrolyte;
and said passage is in electrolyte isolation.

16. A fuel cell in accordance with claim 1 wherein:
said catalyst is adapted to also promote uniform current
   distribution in said cell.

17. A fuel cell in accordance with claim 1 wherein:
said anode includes said catalyst.

18. A fuel cell in accordance with claim 1 wherein:
said catalyst is one of increasing activity and concentration in proceeding in the direction of flow of said fuel in said cell.

19. A fuel cell in accordance with claim 1 wherein:
said catalyst is of increasing activity and concentration in proceeding in the direction of flow of said fuel in said cell.

20. A fuel cell in accordance with claim 1 wherein:
said passage is in communication with a heat generating surface of said cell.

* * * * *